Dec. 20, 1960     W. FERRELL     2,964,798
SLUSH MOLDING PLASTISOL ARTICLES
Filed Sept. 3, 1957
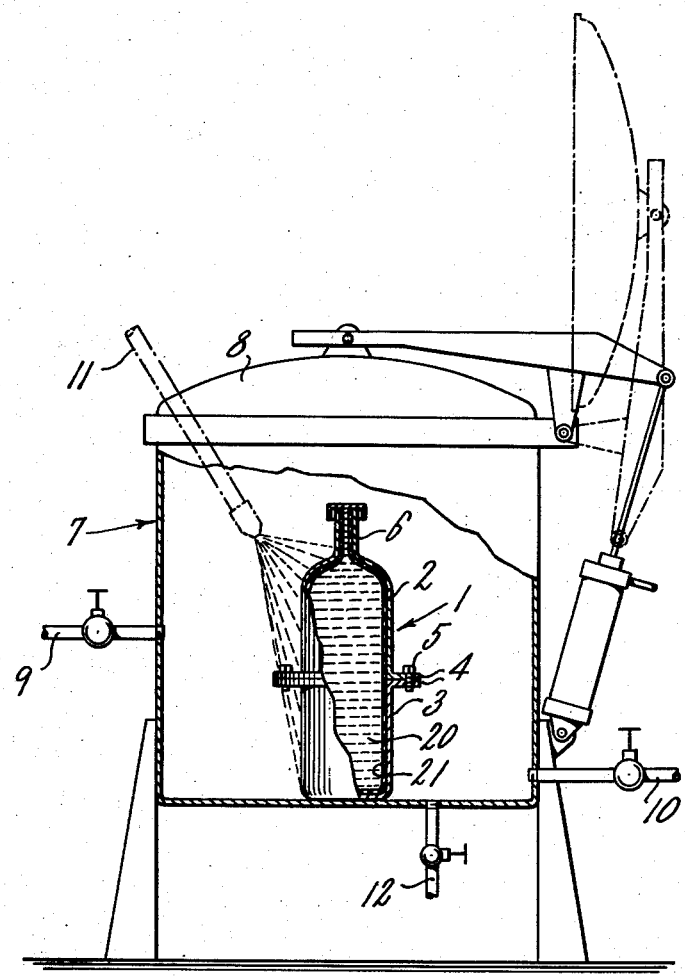
INVENTOR.
WESLEY FERRELL United States Patent Office 2,964,798
Patented Dec. 20, 1960

2,964,798
SLUSH MOLDING PLASTISOL ARTICLES

Wesley Ferrell, Fairlawn, N.J., assignor to United States Rubber Company, New York, N.Y., a corporation of New Jersey Filed Sept. 3, 1957, Ser. No. 681,842

3 Claims. (Cl. 18—58)

This invention relates to a method of making articles from thermoplastic resins, and has particular reference to slush molding methods of manufacturing plastisol containers and the improvement of transferring heat rapidly and uniformly to a plastisol within a mold followed by immediate and rapid cooling. This application is a continuation-in-part of my application S.N. 603,949, filed August 14, 1956, and now abandoned.

In the conventional practice of making slush molded articles, a mold is filled with a liquid plastisol mixture and oven-heated for a predetermined time. Liquid plastisol adjacent the mold wall sets-up in a thin skin. The excess liquid, which is uncongealed, is then poured off and the mold again heated sufficiently to completely fuse or set the congealed skin. The skin is then stripped from the mold as the hollow article or container.

The difficulty encountered in making plastisol containers by this method is the inability of obtaining sufficient uniformity in wall thickness of the article. The molds used are generally two flanged metal sections bolted together at the flanges and commonly having reinforcing ribs. At the flanges or the reinforcing ribs, the metal is much thicker than throughout the other areas of the mold, consequently, the coagulant at these thicker areas of the mold is found to be somewhat thinner than desired. This is due to the fact that increases in viscosity are dependent upon a time-temperature relationship. Since the metal mold at the flanges is thicker than elsewhere, more time is required for heat to penetrate the mold at these points. This results in a longer exposure to heat in other sections and hence a greater viscosity and thickness of gelled material. This is especially so where hot air is used as the heating medium, as is the general practice. Furthermore, it has been found that with the use of hot air, the ovens are complicated with baffles and that special molds and instruments are required if any attempt is made at gaining uniformity in the container wall thicknesses. Thus, in spite of the many advantages inherently attributable to slush molding, it has been found that the common use of hot air as the heating medium, has shortcomings which make slush molding impractical in making containers usable under certain conditions requiring uniform wall thickness, as in drop containers.

Accordingly, it is the object of this invention to obviate the foregoing difficulties and to produce plastisol container articles having wall thicknesses more uniform than heretofore obtainable regardless of the irregularities in the mold used and which are, therefore, capable of undergoing great stresses before rupturing. And, more specifically, to do so using rapid heating to gel the plastisol followed by immediate and rapid cooling to effect a sharp separation between gelled and ungelled zones. Other objects will become clear from the specification and from the drawing in which the characteristics of the process are set out.

The invention is based upon my discovery that a quantity of heat large enough to heat the mold and gel the plastisol on the mold wall, suddenly delivered to a metal mold filled with plastisol, will penetrate the mold evenly regardless of irregularities in the metal thickness of the mold and gel a uniform skin of plastisol on the mold. The object is to get the temperature of the interior surface of the mold uniform at a very rapid rate so that there will be little or no irregular penetration. Furthermore, heat in such quantities can be delivered to the plastisol through the mold by condensing saturated steam on the plastisol filled mold or by preheating the mold to a high temperature prior to filling with plastisol.

I have discovered that there is a temperature below which no gelling will occur. There normally exists for about ten degrees above this temperature a transition zone in which the plastisol is only partly gelled and is a soft mushy material which will flow if present in sufficient quantity.

A small amount will not exhibit sufficient flow to do anything more than form a thin film on the gelled material. When the plastisol and mold are heated rapidly, there is a sharp line of demarcation formed between hot plastisol and cold plastisol due to the high temperature, short time relationship. There would therefore be very little material in the transition range since this is at the low end of the scale. If the plastisol is heated slowly, there is a gradual buildup of temperature through the plastisol and hence a relatively large amount of transition material is present due to the longer time allowed for the heat to penetrate the plastisol. In order to maintain the sharp line of demarcation between gelled and ungelled zones, and thereby improve subsequent drainage and insure uniform thickness of gelled deposit, the heat must be prevented from spreading once the desired penetration has been reached and this is effected by rapid cooling immediately after termination of rapid heating. In the practice of my invention, I have found that both rates, that of cooling and that of heating should be rapid and should be roughly equal. I prefer the temperature of my heating medium to be as close as possible to the decomposition temperature of the plastisol without actually causing decomposition.

In carrying out the invention the plastisol employed may be a polyvinyl chloride, having particle size of microscopic dimension, in a suitable organic plasticizer. The diameter of particles may range in size from one-half to approximately three microns (one micron equals .0004 cm.). Limited amounts of other resin chemicals similar to polyvinyl chloride may be admixed with the polyvinyl chloride. The plasticizer may be any one of a wide variety and several may be used together. Among those which can be used are di-2-ethylhexyl phthalate, dioctyl sebecate and tricresyl phosphate. Dispersions are attained by grinding the resin with the plasticizer and by mixing the ingredients directly in a blender or mixer if the average particle size is sufficiently small. Although polyvinyl chloride is insoluble in the plasticizers at ordinary temperatures, it forms a uniform fluid mixture with it. By raising the temperature of the plastisol the polyvinyl chloride dissolves in the plasticizer. For practical purposes, a temperature as high as can be obtained without causing decomposition of the plastisol is preferred. This solution when heated to a moderate temperature of say below 212° F., congeals the material but does not completely or permanently set or fuse it until a higher temperature generally above 350° F., is applied.

A metal mold, preferably of the two-piece type which has its inside contoured to the shape of the desired article to be made, is used. However, electroformed, sand cast or sprayed metal molds may be used if the walls are sufficiently thin to expedite the transfer of heat to and from the plastisol within the mold. Preferably the mold is provided with a standpipe for filling and pouring off the excess liquid resin.

In the first embodiment of my invention, the mold is generally filled to a point in the standpipe so that the liquid resin contacts all the interior wall. This step is carried out at a temperature which is below the congealing or gelling temperature of the resin mixture; generally room temperature is suitable.

After the mold is filled with plastisol the open end of the standpipe is loosely covered with a plate or inverted cup and the mold is placed in a steam pressure chamber for the purpose of gelling or congealing a layer of the plasticized resin mixture on the mold wall. The gelling or congealing step is performed by circulating saturated steam under pressure through the chamber and around the mold within it. The steam pressure should be at least 20 p.s.i. and the maximum pressure should be the pressure corresponding to a temperature just below the decomposition temperature of the plastisol. For practical purposes, this upper limit can be set at about 235 p.s.i. corresponding to a temperature of 400° F. Heat transfer through metal from saturated steam at these pressures is so rapid that heat will penetrate the mold metal and reach the plastisol so suddenly that a layer of plasticized resin liquid forms almost immediately on the inside walls of the mold and produces a sharp line of demarcation between the gelled and ungelled portions of the plastisol. The steam pressure minimum is dictated by the fact that at a pressure under 20 p.s.i. the gel or congealed layer is mushy and generally thinner over the thicker portions of the mold wall, indicating that the transfer of heat through the metal mold wall is too slow and too small in quantity. Steam at pressures higher than 235 p.s.i. would cause decomposition of the plastisol.

The filled mold is allowed to remain in the high pressure steam chamber until the congealing step is completed which is for a time, ranging from a fraction of a minute to one or two minutes, depending upon the pressure of the steam and the thickness of the wall desired in the finished article.

At the end of the congealing step, when the predetermined thickness has gelled, the mold is cooled immediately at a rate approximately equal to the rate of heating by sprinkling it with cold water, it is then removed and inverted so that the uncongealed excess plastisol is drained from the mold. The mold, containing the adhering congealed plastisol skin, is then placed in an oven for final curing. The mold should then be heated at a temperature of about 350° F. to fuse or completely set the gelled plastisol layer. The time for fusing depends on the thickness of the plastisol layer; generally 20 to 30 minutes is effective.

After the curing step, the mold is removed from the curing oven, and cooled so that the article within the mold is sufficiently cool for handling it. The mold is then opened and the article stripped out of it.

In the drawing, apparatus is shown for carrying out this described method. As there shown, the mold is designed for making a hollow bottle and comprises two separable half sections 2 and 3, each of which is provided with an integral flange 4. Bolts, one of which is shown at 5, passing through the flanges clamp the sections together. One of the sections 2 is provided with a standpipe 6 for admitting and draining plastisol from the mold.

The mold is shown, filled with a plastisol liquid 20 having a gelled skin 21, placed within a combined tank and autoclave 7 having a removable wall or cover 8. Valved connecting conduits 9 and 10 are provided for circulating steam through the tank. A nozzled conduit 11 is provided as a means of supplying sprinkled water to the mold in the cooling step in the practice of the method from the top of the tank 7 after the cover 8 is opened as shown in the dotted lines of the drawing. Conduit 12 is provided for draining water from the tank 7. As shown in the drawing, the combined tank and autoclave is used for the gelling, cooling and curing steps in the method. Separate tanks and autoclaves may be used for each of the steps of the method, if so desired.

As an example of a satisfactory practice of the invention, a plastisol consisting of a very fine mesh polyvinyl chloride dispersed with a pigment into di-2-ethylhexyl phthalate plasticizer was poured into a bottle-shaped mold equipped with a standpipe, and having a capacity slightly in excess of 10 gallons at room temperature. The liquid stood about three inches in the standpipe. An inverted cup was placed over the standpipe and the filled mold was put in the steam chamber or autoclave, where steam was supplied at a pressure of 70 p.s.i. which has a temperature of 315.9° F. One minute was allowed for the steam to reach 70 p.s.i. and it was maintained at that pressure for three quarters of one minute. The steam was then exhausted and one minute was allowed for the pressure to fall. The chamber was then opened and cold water sprayed immediately on the mold until the temperature of the plastisol was well below the congealing temperature. The uncongealed liquid plastisol was then poured out and the mold allowed to drain for an appreciable time. The mold was then placed in hot air of about 350° F. temperature for about one-half hour, thereafter cooled sufficiently low for handling; opened, and the molded article removed therefrom. The article thus made had an especially uniform wall thickness of 0.200". It was filled with water, stoppered and tested by dropping it several times from an airplane at heights of 2 miles onto various materials, as a concrete paving, on the ground, etc. There was no damage to the bottle at any time after repeated impacts of the bottle.

A second embodiment of my invention involving rapid heating followed by rapid cooling of a plastisol during slush molding is attained by heating an empty mold in any manner known to the art to a high temperature, preferably between 200° F. and 400° F. and then filling the mold with plastisol, allowing the plastisol to congeal to the desired thickness by means of heat transferred to it from the heated metal mold followed by immediate and rapid cooling and subsequent treatment as previously described herein with respect to the first embodiment of my invention. The interior surface of the mold having been heated to a high uniform temperature the delivery of heat to the plastisol from the mold wall will be rapid and uniform and the product obtained in this manner will be the same as that obtained in the first embodiment using saturated steam to effect the rapid and uniform heating.

From a theoretical viewpoint, the success of my invention may, perhaps, be explained by a comparison between heating with air and heating with saturated steam, both media being initially at the same temperature, say 328° F. (100 p.s.i.a. steam). Steam will condense, and leave as a saturated liquid at 328° F., yielding to the mold 889 B.t.u. per pound of steam. Air, on the other hand, being non-condensible, will deliver up heat only at the expense of a temperature drop in itself. If the hot air were to contact the mold at 328° F., let us assume for purposes of efficiency a temperature drop of no more than 50° F., it would yield only 12.5 B.t.u. per pound. Hence, for the same amount of heat to be transferred from the air as from the steam above discussed, it would require more than 71 pounds of air to replace one pound of steam at the same temperature. This figure is obviously much too high for common usage so that considerably less air per unit time interval would have to be used and hence a lower rate of heat transfer. The hot air would eventually heat the plastisol to the requisite temperature but it would take much longer than when steam is used. It is this time factor, I believe, that causes my invention to operate.

Because of the high overall heat transfer rate when steam is used, the rate is so fast through the mold wall that even a factor of 10 times the thickness of the wall at the flanges will not result in a heat transfer delay of more than a second or two at these thicker sections and hence will have very little effect on the plastisol. If air, on the other hand, is used for heating to the same temperature at a much slower rate, it will take an appreciably longer time for the heat to penetrate the flanges than to penetrate the mold wall. This time delay can, possibly, amount to as much as thirty minutes or perhaps even more. This delay, being appreciable, results in non-uniform wall thickness of the plastisol. The portion of the gel adjacent to the mold wall would be considerably thicker than that adjacent to the flanges due to the difference in heat penetration.

Following these same considerations, it is apparent that any heat transfer medium, in addition to steam, may be used provided it can give up a relatively large amount of heat per unit surface area of the mold. It is to be understood that all throughout this specification and the claims appended thereto, that the designation p.s.i. is to be construed as meaning pounds per square inch of gauge pressure or pounds per square inch above atmospheric pressure. The designation p.s.i.a. refers to pounds per square inch of absolute pressure.

While the invention has been described herein as practiced in the manufacture of hollow articles such as containers, it is equally applicable to the manufacture of other articles which are slush molded plastisols.

Having thus described my invention, what I claim and desire to protect by Letters Patent is:

1. The process of making thermoplastic articles having a uniform wall thickness from a liquid plastisol mixture of polyvinylchloride resin and a plasticizer therefor and substantially free of any cross-linking agent, comprising the steps of filling a sectional metallic originally unheated mold having a non-uniform wall thickness and having a standpipe to a point in the standpipe with the mixture, loosely capping the standpipe to prevent entrance of material but permitting equalization of pressures in and out of the mold, subjecting all exterior parts of the originally unheated filled mold simultaneously to saturated steam at a pressure between 20–235 p.s.i. and maintaining said steam pressure for a period of time up to two minutes until a uniform layer of the mixture of a desired thickness congeals on the inner wall of the mold, immediately cooling the mold rapidly at a rate close to the rate of heating to a point below the setting temperature of the mixture, draining the mold of the uncongealed mixture, heating the mold at about 350° F. until the layer congealed in the mold is fused, cooling the mold and removing the article therefrom.

2. The process of making thermoplastic articles having a uniform wall thickness from a liquid plastisol mixture of thermoplastic resin and a plasticizer therefor and substantially free of any cross-linking agent, comprising completely filling an originally unheated mold having a non-uniform wall thickness with the mixture, applying saturated steam under pressure of from 20 to 235 p.s.i. to all exterior parts of the originally unheated filled mold simultaneously and maintaining said steam pressure for a period of time up to two minutes to congeal a uniform layer of the mixture of a desired thickness inside the mold, rapidly cooling the mold, draining the uncongealed portion of the mixture, heating the mold until the congealed layer is fused, cooling and removing the article therefrom.

3. The process of making hollow thermoplastic articles having a uniform wall thickness from a liquid plastisol mixture of thermoplastic resin and a plasticizer therefor and substantially free of any cross-linking agent comprising depositing the mixture in an unheated mold having walls of non-uniform thickness, rapidly heating the mold by subjecting all exterior parts of the originally unheated mold simultaneously to saturated steam at a pressure of from 20 to 235 p.s.i. and maintaining said steam pressure for a period of time up to 2 minutes to congeal a uniform layer of the mixture of a desired thickness on the walls of the mold, immediately cooling the mold to provide a sharp transition between the congealed layer and the uncongealed portion of the mixture, draining the uncongealed portion of the mixture, heating the mold to fuse the congealed layer, and removing the article from the mold, thereby providing a hollow plastic article having uniform wall thickness.

References Cited in the file of this patent

UNITED STATES PATENTS

| | | |
|---|---|---|
| 1,998,897 | Kay | Apr. 23, 1935 |
| 2,562,204 | Milton | July 31, 1951 |
| 2,777,165 | Hurt | Jan. 15, 1957 |

FOREIGN PATENTS

| | | |
|---|---|---|
| 591,611 | Great Britain | Aug. 22, 1947 |
| 725,100 | Great Britain | Mar. 2, 1955 |